United States Patent [19]

Steinbock

[11] E Patent Number: Re. 33,490

[45] Reissued Date of Patent: Dec. 18, 1990

[54] APPARATUS TO MECHANICALLY STRESS A BOLT-TYPE FASTENER

[76] Inventor: Rolf H. Steinbock, 128 Grienbrier Dr., Carnegie, Pa. 15106

[21] Appl. No.: 272,719

[22] Filed: Nov. 16, 1988

Related U.S. Patent Documents

Reissue of:

[64] Patent No.: 4,622,730
Issued: Nov. 18, 1986
Appl. No.: 704,967
Filed: Feb. 27, 1985

U.S. Applications:

[63] Continuation-in-part of Ser. No. 595,402, Mar. 30, 1984, abandoned.

[51] Int. Cl.[5] ..... F16D 1/00; F16D 35/00; B21B 13/02

[52] U.S. Cl. ..... 29/116.2; 403/320; 411/432

[58] Field of Search ..... 29/110, 116.2, 426.6, 29/446; 403/11, 12, 320; 411/432, 433, 431, 435, 427, 337, 353, 354, 511, 516, 517, 521, 533, 535, 536, 539, 916, 917, 140; 285/396, 361

[56] References Cited

U.S. PATENT DOCUMENTS

| | | | |
|---|---|---|---|
| 7,318 | 4/1850 | Brown | 285/396 |
| 1,418,379 | 6/1922 | Karle | 411/517 X |
| 3,462,180 | 8/1969 | Bunyan . | |
| 3,618,994 | 11/1971 | Gepfert et al. | 287/53 R |
| 3,624,880 | 12/1971 | Justus et al. | 29/116.2 |
| 4,326,826 | 4/1982 | Bunyan | 411/432 X |
| 4,338,037 | 7/1982 | Deminski | 403/320 X |

FOREIGN PATENT DOCUMENTS

| | | | |
|---|---|---|---|
| 2135015 | 11/1972 | Fed. Rep. of Germany | 29/110 |
| 643329 | 5/1928 | France | 403/320 |
| 349811 | 12/1972 | U.S.S.R. . | |
| 473545 | 10/1937 | United Kingdom . | |
| 510144 | 7/1939 | United Kingdom . | |
| 764539 | 12/1956 | United Kingdom . | |
| 1136280 | 12/1968 | United Kingdom . | |
| 2088263 | 6/1982 | United Kingdom . | |
| 2134613 | 8/1984 | United Kingdom . | |
| 2144819 | 3/1985 | United Kingdom . | |

*Primary Examiner*—Timothy V. Eley
*Attorney, Agent, or Firm*—Clifford A. Poff

[57] ABSTRACT

A plurality of jack bolts are threadedly engaged with openings in a flange on a fastener to stress a shank part of the fastener. The flange can be a collar retained on a shaft by a retainer, a nut on a threaded end of a bolt or the head portion of a bolt. The jack bolts can be arranged in a flange on an end of the tension rod to stress arbors against opposite sides of a roll sleeve to form a roll assembly for use in a rolling mill.

22 Claims, 6 Drawing Sheets

DETAIL 19A

DETAIL 19B

APPARATUS TO MECHANICALLY STRESS A BOLT-TYPE FASTENER

Matter enclosed in heavy brackets [ ] appears in the original patent but forms no part of this reissue specification; matter printed in italics indicates the additions made by reissue.

CROSS-REFERENCE TO RELATED APPLICATION

This application is continuation-in-part of application Ser. No. 595,402, now abandoned, filed Mar. 30, 1984.

BACKGROUND OF THE INVENTION

This invention relates to apparatus to stress a shank part of a fastener such as a bolt, shaft, or a stud, and more particularly to providing a plurality of jack bolts arranged at spaced-apart locations to extend between a surface of a support and an outer peripheral part of a flange for stressing the fastener through torque applied to the various jack bolts. The flange can be an integral part of the shank or the flange can be retained on the shank by, for example, threads, any of numerous forms of a retainer ring or a fastener. The apparatus of the present invention can be used, for example, to clamp arbors against opposite sides of a roll sleeve to form a roll assembly.

It is a common practice for workmen to stress a bolt by applying torque to the bolt head to advance a threaded portion along threads in a tapped hole or a nut member so that the shank portion of the bolt is placed under a desired or predetermined mechanical stress. The stress imparted to the shank portion of the bolt can be determined by using a torque wrench to measure the torque applied to the bolt or by using other means to measure the applied force by a spanner wrench. The torque may be applied to the head portion of the bolt or to the nut. A stud can be stressed in a similar way by torque applied to a nut engaged with a threaded portion of the stud. The present invention is designed to permit stressing of a large fastener, e.g., a bolt or a stud, having a diameter generally one-inch or larger. The magnitude of stress than can be applied to a bolt, stud or similar fastener has limits of practicality, particularly with respect to workmen. A one-inch diameter threaded bolt made of high-strength material can be tightened by the use of a spanner wrench to the elastic limit of the material. With coarse threads, a stress to the elastic limit of the material requires about 1000 ft-lb of torque, [i.e.] *e.g.* 100 pounds of force applied by a 10 foot lever. Under ordinary [condition] *conditions*, this exceeds *both* the practical length of the lever and the amount of force a workman can deliver to the lever. Under usual conditions, a workman using a spanner wrench cannot stress the shank of a nut and bolt assembly that is four inches in diameter with coarse threads to 57,000 ft-lb which is the required torque to stress the bolt to the elastic limit of a typical material comprising the nut and bolt. To develop torque of this magnitude, 5700 pounds of force must be applied to a 10-foot long lever which cannot be accomplished without employing massive machinery or special facilities.

Hydraulically-powered devices are known in the art for stressing or tensioning the shank portion of a fastener but such devices are undesirable because the magnitude of force which can be developed is restricted to available mounting space for the device. If space is available for mounting a hydraulic tensioning device, it is typically necessary to develop a hydraulic pressure of about 15,000 psi. Examples of such hydraulic tensioning devices can be found in U.S. Pat. Nos. 3,835,523; 3,841,193; 3,886,707; 4,075,923 and 4,182,215.

Thermal shrinkage is a much older method for stressing a bolt. The bolt is first heated to elongate its shank. The bolt is then torqued to a precalculated stress and finally the bolt is allowed to cool so that upon cooling, thermal shrinkage tensions the bolt. Usually, this method cannot be used where the amount of stress must be accurately controlled or precisely established. It is also difficult to unscrew the bolt from the threaded member without reheating the bolt.

SUMMARY OF THE INVENTION

It is an object of the present invention to provide an apparatus for stressing a shank portion of a bolt, shaft or stud such as a fastener by relatively simple, mechanical means by which relatively high stress levels can be obtained with reasonable accuracy.

It is *a* further object of the present invention to provide an apparatus embodying a compact construction of parts that can be economically produced for stressing the shank portion of a fastener.

It is a still further object of the present invention to provide a roll assembly wherein a tension rod is arranged to stress arbors against opposite sides of a roll sleeve.

More particularly, the present invention provides an apparatus to stress a fastener which includes a shank part extending to a flange and having a plurality of spaced-apart holes spaced about an outer peripheral part thereof to overlie a support member, and a plurality of jack bolts threadedly engaged with the holes to separately receive a torque, the jack bolts having end parts extending from the holes against the support member under an applied torque to develop a stress sufficient to tension the shank part by applying a compressive reaction force against the support member.

The support member may include a washer-like member that can be pressed against a suitable face surface of the support structure. A face surface of a washer-like member directed in a generally confronting relation to the flange on the shank part of the fastener can be hardened to withstand the force of the jack bolts or, if desired, the face surface can be made soft relative to the material of the jack [bolt] *bolts* to avoid upsetting [a] contacting end [face] *faces* of the jack bolts. The flange is provided with an opening or threads to engage with a shank of a bolt, stud or shaft. When the flange takes the form of a ring, a retainer such as a split ring, a snap ring or interlocking fastener, is used to secure the flange to the shank. The magnitude of the compressive force on each jack bolt is only a fractional part of the stress imparted to the shank portion of the fastener. A nut member, or a head portion of a standard nut and bolt assembly, provides sufficient space for threaded engagement of bolts about one or more bolt circles to stress the shank part of the bolt to a magnitude that will at least equal the strength of the bolt shank. Moreover, the apparatus of the present invention is equally useful in specialized applications including a roll assembly for a rolling mill in which the roll assembly includes arbor members that are pulled together against opposite sides of a sleeve under a tremendous clamping force. This clamping force is developed by stress imparted to a shaft connected at one end to one of the arbors and extending through an opening in the other arbor so that an end portion of the shaft projecting therefrom can be provided with a flange. The flange can carry a multitude, e.g. between 10 and 500 or more jack bolts while pressing against the arbor. Means other than a flange and jack bolts can be used to stress the arbors against the roll sleeve. A clamping force of more than 12,000,000 pounds on the roll sleeve can be established. By this arrangement of parts, a roll assembly with a roll body diameter of 50 inches and a width of 86 inches can be provided for use as a backup roll in a hot strip rolling mill or a cold rolling mill.

The invention further provides a roll assembly including a tubular roll sleeve with opposite ends engaged for support by arbors, one of which is connected to a tension rod extending through the roll sleeve and through the other arbor, and means connected to the other arbor and the tension rod for stressing the arbors against opposite sides of the roll sleeve.

These features and advantages of the present invention as well as others will be more fully understood when the following description is read in light of the accompanying drawings, in which.

Figure 19:
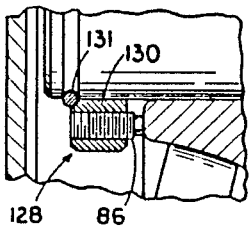
Figure 19:
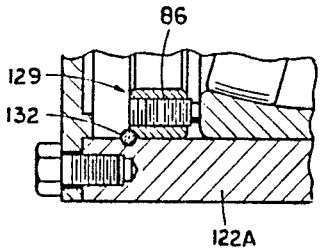
Figure 19:
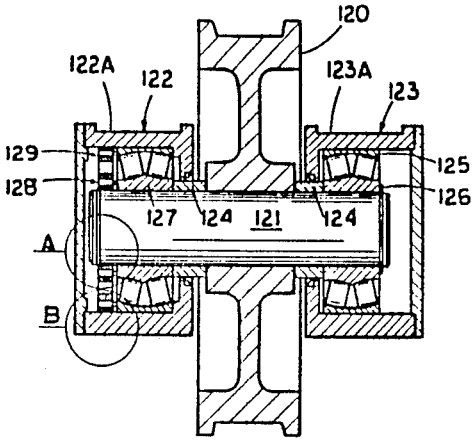
Figure 20:
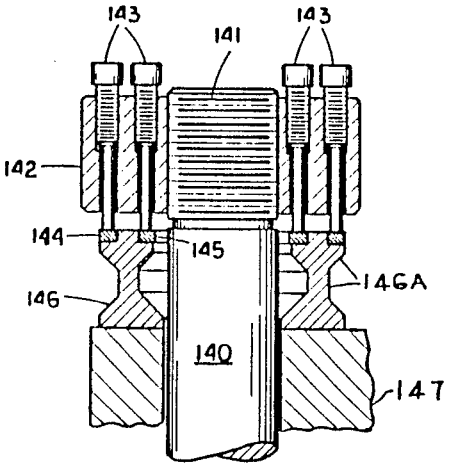

FIG. 19 is an elevational view in section illustrating an arrangement of two collars each embodying the features of the present invention for mounting a bearing assembly on a shaft in a bearing block; and Details 19A and 19B are enlarged views of portions of the apparatus shown in FIG. 19; and FIG. 20 is an elevational view in section illustrating apparatus of the present invention for use with a spacer for clamping a shank portion of a fastener to a member.

Figure 1B:
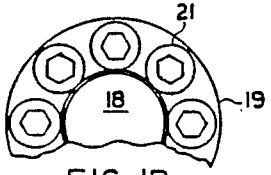
FIGS. 1A and 1B are longitudinal and end views, respectively, of one embodiment of a fastener apparatus embodying the features of the present invention.
Figure 1A:
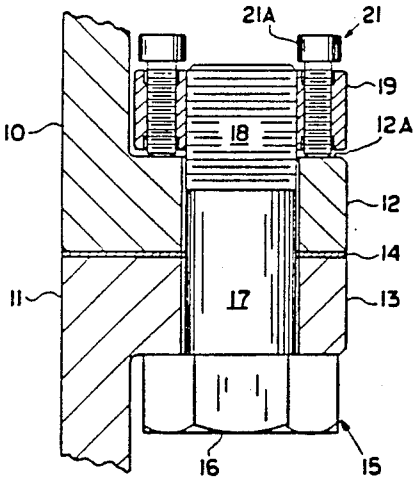

In FIGS. 1A and 1B, there is illustrated a fastener embodying the features of the present invention for forming part of a high-pressure pipe flange assembly which includes two pipe members 10 and 11 having pipe flanges 12 and 13[,] which are clamped together [with a gasket 14] between the pipe flanges. A plurality of fastener assemblies 15 is received in suitable openings which are spaced about the outer peripheries of the pipe flanges. Each fastener assembly 15 includes a bolt member having a head portion 16, a shank portion 17 and a threaded end portion 18. The threaded end portion is engaged with a nut member 19. The nut member [function] *functions* as a flange and includes a plurality of drilled and tapped holes spaced about a bolt circle located between the outer edge of the nut and the threaded bore. A jack bolt 21 is received in each of the drilled and tapped holes in the nut. The jack bolts may be of a standard design and may be embodied as socket-head cap screws each having a length sufficient to extend through tapped holes in the nut 19 and present an end portion extending into compressive engagement with a support surface 12A provided by flange 12. Because the jack bolts have socket head portions, the length of the jack bolts must be sufficient so that the threaded shanks can be advanced along the tapped holes until a [desire] *desired* torque is established without contact between the socket-head portion 21A and the nut member 19. It will be understood that the nut member 19 can be rotated on the threaded end portion 18 to contact or form a small gap between the nut member and surface 12A of flange 12. The jack bolts 21 are then rotated until the end portions extend from the nut member to contact flange 12. It is preferable to torque the jack bolts in a patterned sequence such as by torquing jacks bolts at opposite sides of the nut and then advancing to a next jack bolt in the bolt circle. A torque wrench or other control means such as an impact wrench with a variable torque setting can be used to tighten the jack bolts. Also, a lubricant such as graphite can be applied to the threads of the jack bolts to facilitate torquing thereof.

To further illustrate the utility of the present invention, let it be assumed that a fastener assembly 15 is $1\frac{1}{2}$ inches, course-thread series, with six threads per inch. Ten jack bolts can be arranged in a bolt circle in the nut member. When all the jack bolts are torqued to 60 ft-lb, the shank part 17 of the fastener is stressed to a maximum stress of 93,000 psi. By way of comparison, for example, the torque required to obtain the maximum stress level with a standard nut is 2700 ft-lb and this requires 270 pounds of force on a ten-foot lever arm of a torque wrench. This same stress level can be developed by applying 60 pounds of force on a one-foot lever arm of a torque wrench to each of the ten jack bolts. In this example, the maximum total clamping force on the flange using fastener assembles of the present invention is 120,000 pounds. By way of a further example, a bolt size of 3½ inches with a course thread series of four threads per inch can be provided with sixteen jack bolts in the nut member thereof. The fastener can be stressed to 96,000 pounds psi by torquing each jack bolt to 480 ft-lb which can be accomplished by applying 48 pounds of force to a ten-foot long lever arm of a torque wrench. By way of comparison, 40,000 ft-lb of torque must be [applies] *applied* to the same nut member of this fastener assembly which is too high for torquing directly by a wrench.

Figure 2B:
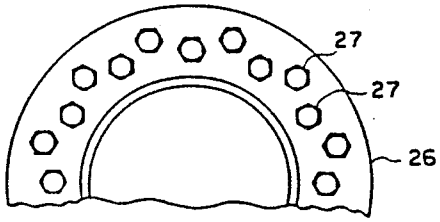
FIGS. 2A and 2B are views similar to FIGS. 1A and 1B and illustrating a second embodiment of the fastener apparatus.
Figure 2A:
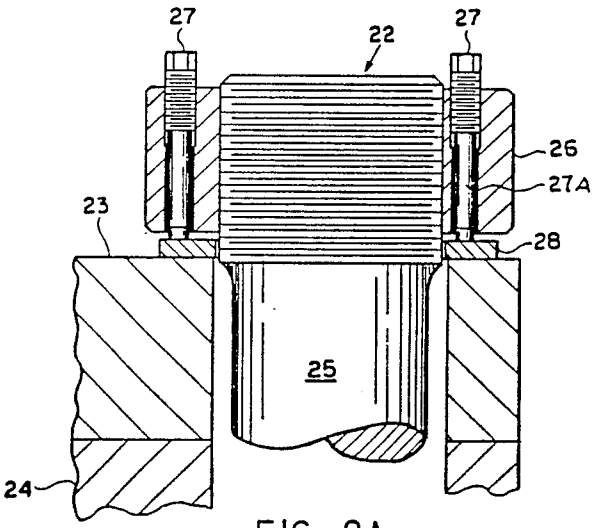

FIGS. 2A and 2B illustrate a further embodiment of fastener assembly 22 to anchor a structure, a portion of which is identified by reference numeral 23 to a foundation 24. The structure 23 includes a suitable opening through which the shank portion 25 extends. A projecting end portion of the shank portion 25 is provided with threads to engage with threads on a collar 26 which, as is apparent from FIG. 2B, takes the form of a sleeve ring. The concentric bolt circles have their center situated to coincide with the axial center of the threads in the collar 26. A staggered or alternating arrangement of bored and tapped holes is provided in the collar, and a jack bolt 27 is threaded in each tapped hole. Each jack bolt includes a threaded portion that extends to an elongated and cylindrical shank 27A. The shank is supported by the bore in the nut to prevent buckling along the length of the shank. At the terminal end of the shank there is [preferable] *preferably* provided a chamfered end which extends from the collar 26 into engagement with a ring 28 which can be hardened to better withstand the clamping force developed by the jack bolts which press the ring against the structure 23. The ring 28 can be made of relatively soft metal or other material so that the material of the ring will upset under the [applied force] *force applied* by the jack bolts and, thereby, avoid [an] upsetting of the end face of the bolts in contact with the ring. The end of each jack bolt which is opposite the chamfered portion extends from the ring and [has] has a head to receive a socket coupled to a suitable torque wrench. For illustrative purposes only, there are twenty-four jack bolts arranged in the flange with twelve jack bolts spaced about each of the bolt centers in an alternating arrangement. It is to be understood, of course, that the number of jack bolts that can be arranged in a given collar member is selected according to the desired stress that is to be imposed on the shank portion of the fastener. The jack bolts can be arranged in only one bolt circle, but two or more bolt circles may be used to accommodate a required number of jack bolts.

Figure 3B:
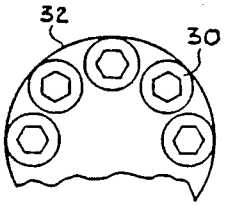
FIGS. 3A and 3B are views similar to FIGS. 1A and 1B and illustrating a third embodiment of the fastener apparatus.
Figure 3A:
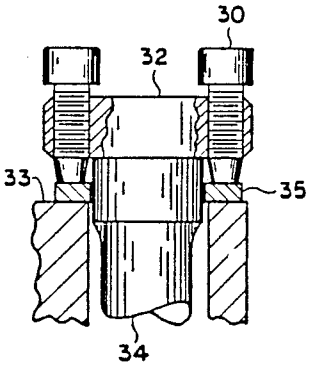

In FIGS. 3A and 3B, a third embodiment of the fastener assembly according to the present invention is illustrated which differs from [that] *those* already described by the fact that jack bolts 30 are engaged in threaded openings spaced about a bolt circle in the head portion of a conventional bolt 32. The bolt shown in FIG. 3A forms part of an anchor for a machine element 33. A shank portion 34 of the bolt member extends through an opening in the machine element and projects into a foundation where it is anchored in a suitable, well-known manner. As shown in FIG. 3B, the jack bolts are embodied as socket-head cap screws having socket portions at their ends projecting from the head of the fastener. The opposite ends of the jack bolts are chamfered and engage with a hardened steel support ring 35.

Figure 4:
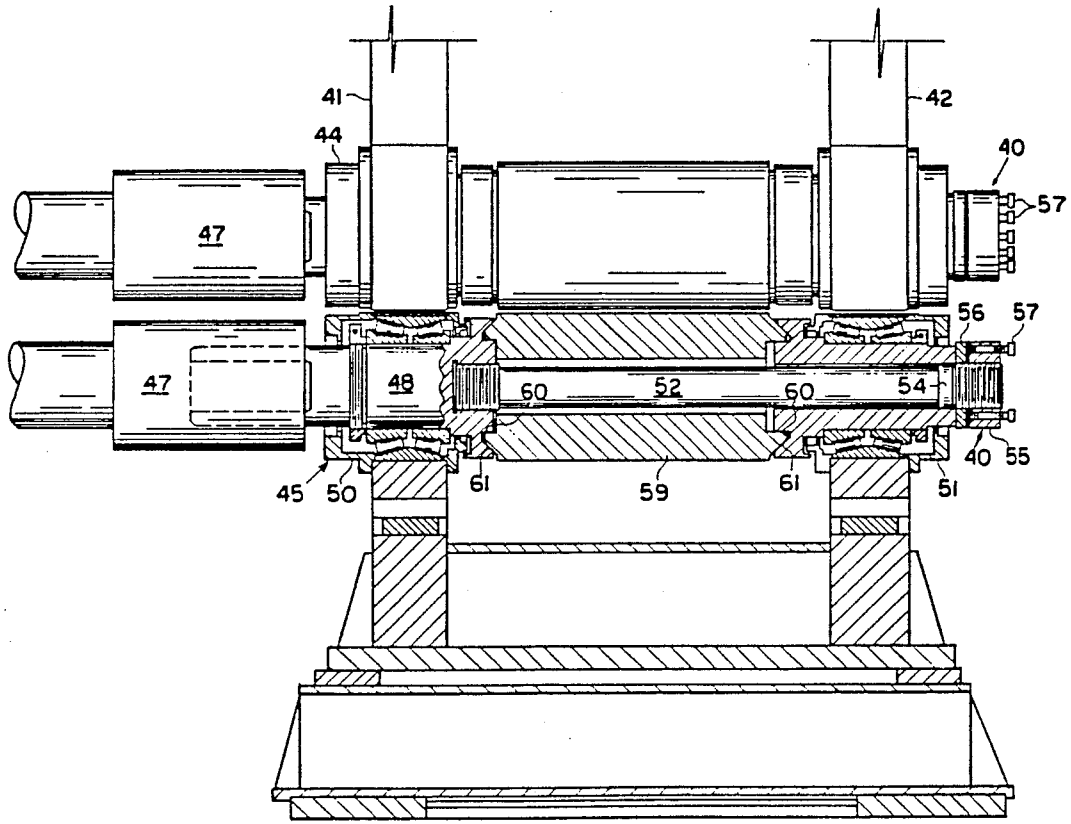
FIG. 4 is an elevational view, partly in section, of a rolling mill wherein a roll assembly includes a fastener apparatus embodying the features of the present invention.

In FIG. 4, there is illustrated a still further embodiment of the present invention in which a fastener assembly 40 is part of a roll assembly for use in a 2-inch rolling mill. The rolling mill includes spaced-apart mill housings 41 and 42 each having window openings into which bearings chocks are received and carry bearings on journals at opposite ends of upper and lower roll assemblies 44 and 45. An end portion of each roll assemblies extends to coupling members 47 of spindles which are coupled to a drive at one side of the mill stand. A screwdown is provided in the mill housings for adjusting one roll assembly relative to the other. The rolls are held apart by roll balance cylinders, not shown. Each roll assembly includes spaced-apart arbors 48 and 49 mounted in bearings received in bearing chocks 50 and 51, respectively. A tension shaft 52 has a threaded end portion engaged with threads formed in an opening in arbor 48 and extends through an opening in arbor 49. Shaft 52 is centered and supported by a collar 54 on a shaft 52 in the opening in arbor [48] *49*. Projecting outwardly beyond the collar portion 54 is a threaded end portion, the threads of which engage with threads on the flange 55. A hardened ring 56 is positioned between the flange 55 and arbor 49. The ring can be made of a relatively soft material, if desired, to prevent upsetting of the ends of the jack bolts as described hereinbefore. The flange is provided with a plurality of spaced-apart drilled and tapped holes, each of which receives a jack bolt 57. A roll sleeve 59 has an enlarged central bore which is sufficiently large so that an annular gap is formed between the roll sleeve and the tension shaft. Opposite end surfaces of the roll sleeve include an annular support surface 60 and an outwardly-tapering conical clamping surface 61 which [engages] *engage* with mating surfaces formed in the arbors. The clamping force which can be developed by the jack bolts is sufficient to maintain the arbors tightly clamped to the roll sleeve even when the roll assembly is subjected to a massive separating force occurring during the rolling operation. The rolling forces are transmitted from the sleeve while supported only at its ends by the arbors. A gap or space between the sleeve and the tension member is intended and this space is so great that no contact exists therebetween.

Figures 5A, 5B:
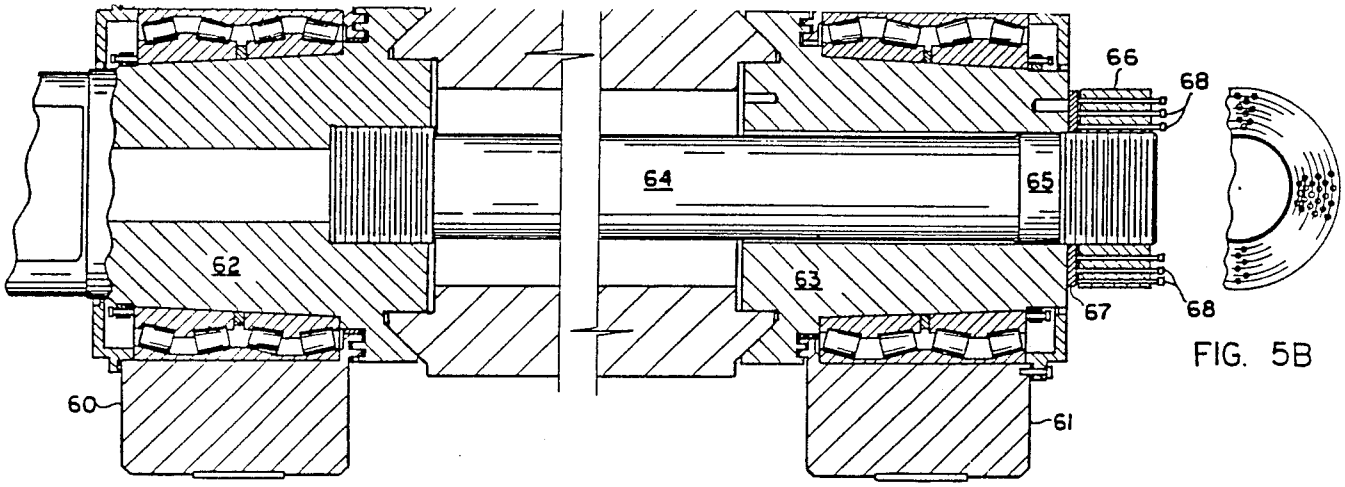
FIG. 5A is a longitudinal sectional view through a backup roll assembly for a rolling mill embodying the features of the present invention.
FIG. 5B is a partial end view of the roll assembly shown in FIG. 5A.

[FIG. 5] *FIGS. 5A and 5B* illustrates a further embodiment of the present invention embodied as a backup roll assembly for 4-high rolling mill. As is well known in the art, two backup roll assemblies are supported by spaced-apart mill housings to transfer rolling loads from relatively small diameter work rolls to the mill housings. The backup roll assembly shown in FIG. 5 includes spaced-apart bearing chocks 60 and 61, each of which supports bearing assemblies that are mounted on arbors 62 and 63, respectively. Arbor 62 has a central bore that is enlarged by a counterbore that is threaded and receives the threaded end portion of a tension rod 64. The tension rod extends through a central opening in arbor 63 where the rod is held in a central position by a collar 65. An end portion of the tension rod extends from the arbor 63 and has threads that mate with threads formed on a collar 66. A hardened ring 67 is positioned between the arbor 63 and the collar for engagement with the end parts of the multitude of jack bolts 68. For the purpose described previously, the hardened ring can be replaced with a ring made of relatively soft metal. Merely for purposes of illustration, it is contemplated that between 200 and 250 jack bolts [are] *be* spaced apart about six different and concentric bolt circles to stress the tension rod 64 which has a nominal diameter of about 15 inches. The jack bolts can be develop at least 6,000,000 pounds and up to 12,000,000 pounds of stress on the tension rod which is sufficient to withstand a nominal rolling load of 12,000,000 pounds on the roll sleeve. This is 300% more than an anticipated rolling load. The roll sleeve can have a nominal outside diameter of 50 inches and a length of 86 inches. The opposite ends of a roll sleeve are supported by the arbors in the same manner as described previously in regard to the embodiment of FIG. 4.

Figure 6:
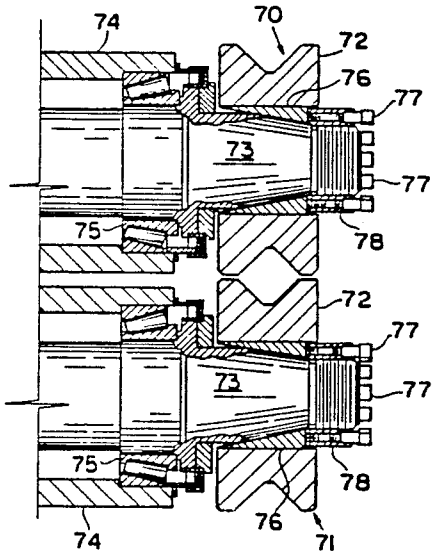
FIG. 6 is a view illustrating a further form of a roll assembly embodying the features of the present invention[.]

A still further embodiment of the present invention [illustrated] *illustrating* a rolling mill arrangement using a pair of cooperating grooved roll assemblies 70 and 71 is shown in FIG. 6. The roll assemblies cooperate to form a roll gap having a square configuration. [The] *Each of the* roll assemblies [each] includes a roll collar 72 which is supported on an end portion of a shaft 73 extending in cantilevered fashion from a bearing housing 74 wherein an anti-friction bearing 75 supports the shaft. Between the collar 72 and the shaft 73 there is an annular tapered sleeve 76 which is pressed into a tapered gap between the roll collar and the shaft by a plurality of jack bolts 77 spaced apart along a bolt circle defined on a nut collar 78. The collar 78 includes a central threaded portion which is threadedly engaged with threads on the end of the shaft 73. To facilitate assembly and disassembly of the roll sleeves on the shafts, sleeve 76 is provided with a large tapered angle, e.g., 12 degrees. The tension bolts 77 can be tightened to relatively low torque levels for forcing the tapered sleeve tightly between the collar 72 and the shaft 73.

Figures 7, 8, 9, 10, 11, 12, 13, 14, 15, 16, 17, 18:
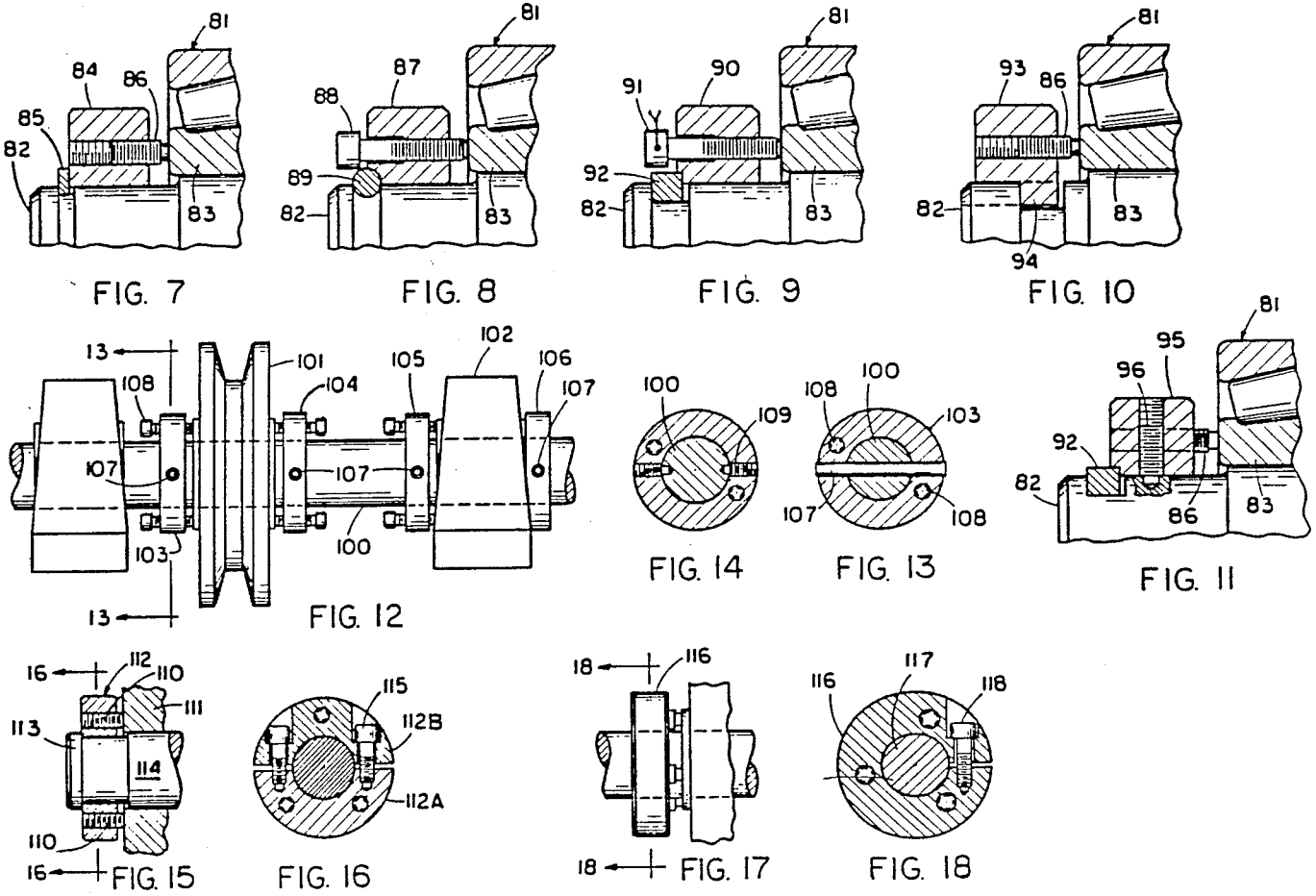
FIG. 7 is a partial sectional view illustrating a thrust collar embodying the features of the present invention held in place by a snap ring.
FIG. 8 is a partial sectional view illustrating a thrust collar similar to FIG. 7 held in place by a split ring made from round wire or bar stock.
FIG. 9 is a partial sectional view illustrating a thrust collar similar to FIG. 7 held in place by a double split ring having a square or rectangular cross section.
FIG. 10 is a view similar to FIG. 7 and illustrating a thrust collar held in place by a bayonet connection.
FIG. 11 is a view similar to FIG. 10 and illustrating the use of additional threaded fasteners for preventing rotation of the thrust collar on a shaft member.
FIG. 12 is an [elevation] *elevational* view illustrating the use of the apparatus of the present invention for clamping and centering a pulley on a shaft and use of the apparatus of the invention to clamp a bearing assembly to the shaft.
FIG. 13 is a sectional view taken along lines 13—13 [in] *of* FIG. 12.
FIG. 14 is a view similar to FIG. 13 but illustrating a further embodiment of apparatus according to the present invention.
FIG. 15 is a sectional view illustrating a split thrust collar embodying the features of the present invention.
FIG. 16 is a sectional view taken along lines 16—16 of FIG. 15.
FIG. 17 is an elevational view of a further embodiment of a thrust collar embodying the features of the present invention clamped to a shaft by a single threaded fastener.
FIG. 18 is a sectional view taken along lines 18—18 of FIG. 17.

In FIGS. 7–11 additional embodiments *are illustrated* of a fastener apparatus [are illustrated] according to the present invention for retaining an anti-friction bearing 81 on a bearing-seat surface of a shaft 82. An inner race 83 of the bearing is pressed against a conventional shoulder surface formed on shaft 82 by a fastener assembly. In FIG. 7, the fastener assembly includes a ring 84 which is formed with a plurality of drilled and tapped holes in a bolt circle at spaced-apart locations with the tapped hole extending parallel to the bore in the ring. Jack bolts [85] *86* in the form of socket set screws are threaded in the drilled and tapped holes so that end portions extend from the ring into engagement with the inner race 83 of the bearing, as shown. A snap ring 85 is placed in a groove located in the end of the shaft to form an abutment surface that prevents displacement of ring 84 from the shaft when the jack bolts are torqued. In the embodiment of FIG. 8, a ring 87 is provided with drilled and tapped holes as described previously in regard to FIG. 7 for receiving jack bolts 88 which take the form of socket-cap screws. Ring 87 is held in place on shaft 82 by a snap ring 89 that is fitted in a circular opening to engage a portion of the ring 87 when jack bolts 88 are torqued to a desired extent.

In FIG. 9, a ring 90 is provided with drilled and tapped holes as shown and described previously in regard to FIG. 7. Jack bolts 91 have shank portions engaged in the drilled and tapped holes so that end portions of the jack bolts extend from the ring 90 into engagement with the inner race of bearing 81. The ring 90 is retained on the shaft against a force developed by the jack bolts by a double-split ring 92 having a square or rectangular cross-sectional shape. The socket head portions of jack bolts 91 are provided with drilled openings extending transversely to the [length] *lengths* of the [bolt] *bolts* and a length of wire is threaded through openings of the various jack bolts to interlock them and prevent unwanted twisting in the threads in the collar after the jack bolts are torqued to produce the desired force on the inner race of the bearing.

In FIG. 10, ring 93 is provided with drilled and tapped holes arranged in a bolt circle in the same manner as described in regard to the embodiment of FIG. 7 and a socket-set screw is provided in each of the drilled and tapped holes. The [inter] *inner* bore of the ring is formed with projecting lug portions separated from one another by a space to form a part of a bayonet connection. The end portion of shaft 82 is provided with milled slots spaced about the circumference thereof so that a slot in the shaft can receive a projecting lug of the ring 93. The ring is advanced toward the bearing until the lug is received in a recess 94 whereupon ring 93 is rotated so that the lug of the ring and a lug of the shaft contact each other. Thereafter the socket set screws are torqued to a desired [extend] *extent* to establish a force of a desired magnitude on the inner race of the bearing. In FIG. 11, a ring 95 is provided with drilled and tapped holes in a bolt circle as shown and described in regard to the ring 84 in FIG. 7. Ring 95 is additionally provided with radially extending drilled and tapped holes into which there [is] *are* received [a] socket set [screw] *screws* 96 [is advanced along] *to be advanced along* the threads in the ring until an end portion protrudes from the ring into a drilled hole in shaft 82. The screws 96 form an interlocking member extending between the ring 95 and shaft 82 to prevent ring 95 from rotating. The jack bolts [85] *86* are arranged in drilled and tapped holes in a bolt circle such that these holes do not intersect with the drilled and tapped holes containing screws 96. The ring 95 is retained on shaft 82 by a ring 92 in the same manner as described hereinbefore in the embodiment of FIG. 9.

In FIG. 12, there is illustrated a shaft 100 on which there [is] *are* positioned at a spaced-apart locations, a sheave 101 and a bearing assembly 102. Fastener assemblies 103 and 104 are arranged on shaft 100 at opposite sides of the sheave 101 and a fastener assembly 105 and a retainer plate 106 are arranged on shaft 100 at opposite sides of the bearing assembly 102. The retainer plate is secured to the shaft by a pin 107 that extends through a diametrical opening in the retainer plate and an aligned opening in shaft 100. In a similar way, fastener assemblies 103, 104 and [106] *105* are secured to shaft 100 by a pin 107. Each of the fastener assemblies includes [a ring 108] *rings* having drilled and tapped holes spaced about a bolt circle with a jack [bolt] *rings* 108 received in each of the drilled and tapped holes. The jack bolts in the embodiment of FIG. 12 comprise socket-head cap screws. End portions of the jack bolts extend from rings 103 and 104 into engagement with an annular section of the sheave. The jack bolts are torqued to a desired extent so that the sheave 101 is clamped between the fastener assemblies under sufficient force to prevent rotation of the sheave on shaft 100. The jack bolts 108 in

[ring] *fastener assembly* 105 are torqued to a sufficient extent so that the bearing assembly 102 is pressed between ring 105 and ring 106 so that the bearing assembly cannot move in an axial direction along shaft 100.

FIG. 13 illustrates a typical section through any one of the rings 103, 104 and 105. There are, as shown, two jack bolts in each ring, although three or more jack bolts can be provided, if desired. In FIG. 14, there is illustrated a modification to the fastener assemblies 103, 104 and 105. The modification provides that socket set screws are threadedly engaged with threads formed in a diametrically-extending opening. The socket set screws are rotated so that end portions extend into drilled openings in shaft [101] *100*. In FIGS. 15 and 16, a still further embodiment of the fastener assembly of the present invention is illustrated in which a bearing member 111 is pressed against a shoulder, not shown, by a fastener assembly that includes a ring 112 that is circumferentially divided into two parts as shown in FIG. 16. Drilled and tapped holes are provided in the ring at spaced-apart locations and receive socket set screws *110* which can be rotated under an applied torque which is sufficient to force the bearing 111 against its support shoulder and displace the ring against a collar section 113 formed on the end of shaft 114. The divided parts of ring 112 are secured together by socket-head cap screws 115 extending into drilled and tapped holes in ring part 112A from drilled holes in ring part 112B. By this construction of parts, the need for a snap ring or other forms of retaining devices as illustrated and described in regard to FIGS. 7–11 can be eliminated.

In FIGS. 17 and 18, a fastener assembly is provided with jack bolts threadedly engaged in openings in a ring 116 in a manner already shown and described in regard to FIGS. 15 and 16. A saw cut is formed in ring 116 so that the ring can be clamped onto a shaft 117 by a socket-head cap screw 118 at a desired site along the shaft.

In FIGS. 19, 19A and 19B, there is illustrated fastener apparatus for securing a pulley 120 to a shaft 121. Opposite ends of the shaft 121 are supported by bearing assemblies 122 and 123. A spacer ring 124 is arranged at each of opposite sides of the pulley. In bearing assembly 123, there is an anti-friction bearing 125 having an inner race that abuts at one face against ring 124 and at the opposite face abuts against a snap ring 126. The outer ring of the anti-friction bearing is supported in a housing 123A. Bearing assembly 122 includes an anti-friction bearing 127 having an inner race that abuts on one side against ring 124 and at the opposite side [there is] a fastener assembly 128. A fastener assembly 129 is supported in a bearing housing 122A to press an outer race of the bearing assembly against a shoulder formed in the bearing housing. As shown in FIG. 19A, the fastener assembly 127 includes a ring 130 which is constructed in the same manner as ring 84 described heretofore and shown in FIG. 7. The jack bolts 86 of the fastener assembly are rotated under a desired torque so that end portions extending from the ring [engaged] *engage* with the inner race of the bearing assembly. The ring 130 engages *with* a snap ring 131 located in a suitable groove formed in an end portion of shaft 121. In FIG. 19B, the fastener assembly 129 is shown and embodies a construction which is the same as fastener assembly [127] *128* except for the provision of a recess in an end face thereof to engage with a retainer ring 132 that is located in a suitable recess formed in the bearing housing 122A. The jack bolts of each fastener assembly [127] *128* and 129 can be torqued to the desired extent so that the inner and outer races, respectively, of the bearing assembly are pressed against the bearing housing. In this way, the outer race can be clamped in the bearing housing and the inner race can be torqued to establish a desired clamping force between rings 124, [sheave] *pulley* 120 and the inner race *of anti-friction* bearing 125.

In FIG. 20, there is illustrated an anchor bolt 140 having a shank portion that extends into a [foundation] *member 147* and a threaded end portion 141 that is engaged with threads formed in a bore of a ring 142 forming part of a fastener assembly according to the present invention. A multitude of drilled and tapped holes are formed in two concentric bolt circles at spaced-apart locations and in each drilled and tapped hole there is threadedly engaged a jack [bolts] *bolt* 143. The jack bolts in the embodiment of FIG. 20 take the form of socket-head cap screws having end portions that project from ring 142 into engagement with one of two washer members 144 and 145. The washer members are, in turn, carried by a collapsible spacer 146 positioned on a member 147. The member 147 may be part of a machine or any well-known element which must be anchored to a foundation or support structure. The washers 144 and 145 are constructed from material having a preselected hardness which is predetermined according to the forces required to support the member 147. The washers are made from sufficiently hard material such as metal or plastic so that the washers can sustain the load imposed thereon by the jack bolts without yielding under the imposed load. On the other hand, the washers are sufficiently soft so that the metal of the end faces of the jack bolts will not upset under the applied load. Also, it is important to prevent destruction of the drilled and tapped holes in ring 142 in the event of an excessive torque applied to any one or more of the jack bolts. In this way, the washers can yield under the excessive load. The spacer 146 includes web and flange sections 146A which will break or shear in the event [the] *that* spacer is subject to an excessive load. The spacer thereby prevents damage to other parts. Also, the spacer can be severed by, for example, a cutting torch in the event the threads of the jack bolts are rendered partially inoperative due to rust or other contaminants. Such a condition of the jack bolts may occur after a long period of continued use of the fastener assembly. Thus, by relieving the fastener assembly of the clamping force, which can be large, the jack bolts may be easily rotated for removal and servicing from [sleeve] *ring* 142.

I claim as my invention:

1. A fastener apparatus to compress a support member against a first member, said apparatus including an elongated shank part extending from said first member and passed freely through an enlarged opening in said support member, an anchor flange connected to one end portion of said elongated shank part for support by said first member, a stress generating flange connected to an opposite end portion of said elongated shank part for exerting a compressive force on said support member, said stress generating flange having a plurality of holes at spaced-apart locations about an outer peripheral part thereof to overlie said support member, and a plurality of jack bolts threadedly engaged with said holes to separately receive a torque, the jack bolts having end parts extending from said holes to stress said elongated shank part extending between said anchor flange and said stress generating flange through torquing said jack bolts for applying a compressive reaction force between said support member and said first member.

2. The apparatus according to claim 1 wherein said support member includes a washer having a face surface defining a preselected hardness for preventing deformation of surfaces of said jack bolts in contact therewith.

3. The apparatus according to claim 1 wherein said stress generating flange includes a collar having an opening to receive a portion of said elongated shank part, said apparatus further including retaining means for anchoring said collar to said elongated shank part.

4. The apparatus according to claim 3 wherein said retaining means includes a retainer supported in a recess in said shank.

5. The apparatus according to claim 4 wherein said support member is an anti-friction bearing.

6. The apparatus according to claim 5 wherein said retaining means includes projection on said collar and said elongated shank part forming a releasable bayonet connection.

7. The apparatus according to claim 1 further including a spacer between said jack bolts and said support member.

8. The apparatus according to claim 7 wherein said spacer includes web and flange sections for breaking and shearing [in the] *when* said jack bolts are torqued to produce an excessive load.

9. The fastener apparatus according to claim 1 wherein said support includes a hardened washer for contact by the end parts of said jack bolts.

10. The fastener apparatus according to claim 1 wherein said support member includes a roll sleeve, said anchor flange and stress generating flange include bearing chocks and said elongated shank part includes an arbor.

11. The fastener apparatus according to claim 1 wherein said stress generating flange comprises an enlarged head portion of a bolt.

12. The fastener apparatus according to claim 1 wherein said stress generating flange comprising a nut member secured by threads to said shank.

13. The fastener apparatus according to claim 1 wherein said stress generating flange has a plurality of holes spaced about different diameter bolt circles, and a jack bolt threadedly engaged with each [hole] *bolt* in each hole circle.

14. Apparatus to compressively support a roll sleeve between arbors for forming a roll assembly, the combination therewith of an elongated shank part secured to one of said arbors to extend freely through an enlarged opening in said roll sleeve and through an enlarged opening in the other arbor, said elongated shank being spaced by an annular gap from said roll sleeve, a stress generating flange secured to an end portion of said elongated shank part extending from said other arbor, said stress generating flange having a plurality of holes at spaced-apart locations about an outer peripheral part thereof overlying the said other arbor, and a plurality of jack bolts threadedly engaged with said holes to separately receive the torque, the jack bolts having end parts extending from said holes against said outer shank part for applying a compressive reaction force on said roll sleeve by said arbors through torquing of said jack bolts.

15. The apparatus according to claim 14 wherein said arbors include annular sleeve support surfaces and an overlying conically-shaped surface for compressively engaging said sleeve.

16. The apparatus according to claim 14 wherein said stress generating flange comprises a nut member threadedly attached to said elongated shank part.

17. The apparatus according to clai 16 including bearing chocks for supporting said arbors.

18. The apparatus according to claim 14 wherein said roll sleeve is compressed between said arbors to resist radially-applied rolling forces on the roll sleeve perpendicular to the length of said elongated shank.

*19. A fastener apparatus to compress a support member, said apparatus including an elongated shank part extending from said support member and passed through an opening in said support member, said shank extending portion and said support member in said opening having a mechanical free relationship throughout the length of said shank portion, an anchor flange connected to one end portion of said elongated shank part for exerting a compressive force on a first portion of said support member, a stress generating flange connected to an opposite end portion of said elongated shank part for exerting a compressive force on a second portion of said support member, said stress generating flange having a plurality of holes at spaced-apart locations about an outer peripheral part thereof to overlie said support member, and a plurality of jack bolts threadedly engaged with said holes to separately receive a torque, the jack bolts having end parts extending from said holes to stress said elongated shank part extending between said anchor flange and said stress generating flange through torquing said jack bolts for applying said compressive reaction forces on said support member.*

*20. The apparatus according to claim 19 wherein said mechanical free relationship is characterized as a press fit between said shank extending portion and said support member.*

*21. The apparatus according to claim 19 wherein said mechanical free relationship is characterized by the absence of intermeshing threads between said shank extending portion and said support member.*

*22. The apparatus according to claim 19 wherein said mechanical free relationship is characterized by adjacent sliding surfaces between said shank extending portion and said support member.*

* * * * *